Patented Dec. 26, 1950                                              2,535,526

UNITED STATES PATENT OFFICE 2,535,526

STABILIZED ZIRCONIA AND METHOD FOR PRODUCING SAME

Archibald H. Ballard and Douglas W. Marshall, Niagara Falls, Ontario, Canada, assignors to Norton Company, Worcester, Mass., a corporation of Massachusetts No Drawing. Application January 19, 1950, Serial No. 139,532. In Canada April 21, 1949

3 Claims. (Cl. 106—57)

The invention relates to stabilized zirconia and a method of producing it. This application is a continuation-in-part of our copending application Serial No. 63,606, filed December 4, 1948 and now abandoned.

One object of the invention is to provide a superior material for thermally insulating the heating coil of induction heating apparatus. Another object of the invention is to provide a simple, inexpensive and reliable method for the production of stabilized zirconia of high purity. Another object is to produce an extremely stable zirconium oxide refractory material useful for the production of many different kinds of refractory bricks and shaped articles for use in high temperature furnaces and the like. Another object of the invention is to provide a method of making a stabilized zirconia in a single operation from any one of a variety of ores such as zircon ores, zirkite ores and baddeleyite ores containing various oxides in various proportions.

Another object of the invention is to produce zirconia with a stabilizing oxide included therein in solid solution. Another object is to produce crystalline zirconia in the form of cubic crystals rather than monoclinic crystals. Another object is to provide refractory material which is a poor heat conductor. Another object of the invention is to provide refractory blocks, bricks and other shapes which are highly refractory and also poor heat conductors and which will not fracture or spall from repeated heating and cooling. Another object of the invention is to provide a satisfactory method for making a relatively pure zirconium oxide product out of readily available and inexpensive ores. Another object of the invention is to make very refractory bricks and other shapes which also are quite strong. Another object is to make extremely refractory grain. Another object is to make refractory material which is also relatively inert at high temperatures.

Other objects will be in part obvious or in part pointed out hereinafter.

The invention accordingly consists in the combinations of elements and in the several steps and relation and order of each of said steps to one or more of the others thereof, all as will be illustratively described herein and the scope of the application of which will be indicated in the following claims.

For carrying out the method of the present invention and for producing the product of the present invention we provide an electric arc furnace of the type disclosed in U. S. Letters Patent No. 775,654 to Aldus C. Higgins patented November 22, 1904. Furnaces of this type comprising iron shells cooled all over with a cascade of water have been in use practically ever since the date of the above patent and are well known to electro-chemists and therefore need not be further described herein.

We prepare a furnace mixture of zirconia ore, coke, iron borings, and as a stabilizing agent we use calcium oxide, lime, CaO.

Various zirconia ores or partially purified zirconia powders can be used and the invention is not limited to any particular one; in fact a particular object of the invention is to provide a satisfactory method for making a relatively pure zirconium oxide product out of readily available and inexpensive ores. These are mainly the zircon ores and the zirkite ores. Analyses of these ores are usually within the following range:

Table I

|  | Per cent |
|---|---|
| $ZrO_2$ | 65 to 95 |
| $SiO_2$ | 3 to 35 |
| $Fe_2O_3$ | 0.1 to 6 |
| $TiO_2$ | 0.1 to 2 |

The quantity of carbon provided in the furnace mixture should be two-thirds of the theoretical quantity of carbon required completely to reduce the silica plus 100% of the theoretical quantity required to reduce all the other oxides (except zirconia) to metal plus about 20% excess over all of these quantities. This quantity can be varied from the above with no excess to the above with 40% excess. The reason why we provide only two-thirds of the theoretical quantity of carbon required completely to reduce the silica is that we have found that about one-third of the silica is volatilized during the furnacing operation. On the other hand the excess mentioned is provided because some of the coke is used up by combining with oxygen other than that provided by the oxides to be reduced.

A particular zirconia ore yielded an analysis as follows:

Table II

|  | Parts |
|---|---|
| Ignition loss | 1.17 |
| $ZrO_2$ | 74.35 |
| $SiO_2$ | 18.25 |
| $Fe_2O_3$ | 3.19 |
| $TiO_2$ | 1.50 |
| Total | 98.46 |

Other typical ores which have been used were found to yield analyses as follows:

Table III

|  | Baddeleyite Favas Type | Zirkite | Zircon |
|---|---|---|---|
|  | Per cent | Per cent | Per cent |
| $ZrO_2$ | 81.60 | 70.79 | 65 –67 |
| $SiO_2$ | 6.27 | 12.18 | 30 –34 |
| $Fe_2O_3$ | 5.54 | 3– 6 | 0.1– 0.5 |
| $TiO_2$ | 1.00 | 1– 2 | 0.1– 1.0 |

Making the stoichiometric calculations and using the above rule of two-thirds and the above rule of 20% excess the amount of carbon required according to our formula for the ore of Table II would be about 6.7% of the weight of the ore. The exact quantity of coke required would depend on the amount of fixed carbon in the particular coke being used.

The quantity of iron, in the form of borings or otherwise, should be enough to form with the silicon that is reduced from silica a ferro-silicon having an iron content of from 75% to 85%. It will be remembered that about one-third of the silica volatilizes so the amount of silicon produced is two-thirds of that present in the silica content of the ore. The purpose of the iron is to combine with the silicon to form a ferro-silicon alloy which has a much higher specific gravity than elementary silicon and therefore will go to the bottom of the furnace and, after solidification, form a ferro-silicon button containing also other reduction products that can readily be separated from the rest of the ingot. If there were no iron in the mix the silicon would be present as such and having a lower specific gravity not all of it would go into the button. In making the above calculation as to the quantity of iron to use, the free iron produced by reduction of the iron oxide should be taken into account so that the 75% to 85% is the total iron, both that which will be produced by reduction of the oxide and that which should be added in the form of borings or otherwise. Therefore the amount of iron to add is enough to make with two-thirds of the silicon present in the ore a ferro-silicon having an iron content of from 75% to 85% minus the amount of iron obtained by the reduction of the iron oxide in the ore to iron and this of course must take into account that, as hereinafter shown, a small percentage of iron oxide remains in the final product.

The quantity of lime as a stabilizing agent to be added should be from 3% to 6% of the amount of $ZrO_2$ in the ore.

The reason for providing the stabilizing agent in the above percentages is that less will not satisfactorily stabilize the zirconia, and more will form a eutectic thus making the product less refractory. The stabilizing agent in the range given causes the zirconia to crystallize predominantly in the cubic system but when less of the stabilizing agent is used the crystals are predominantly monoclinic. Ordinary or natural baddeleyite is monoclinic whereas the product of this invention is predominantly cubic. The monoclinic form of zirconia when made into refractory articles such as bricks and other shapes spalls, checks, crazes or fractures when used in high temperature furnaces. On the other hand, the product of this invention, a zirconia of predominantly cubic crystal form, withstands heat shock for many cycles. When the lime is as much as 6% the crystals are nearly all cubic and when the lime is as low as 2.7% about 35% of the crystals are cubic. The following table shows the content of cubic crystals in various lots of fused zirconia containing different percentages of lime.

Table IV

| Percentage Content of Lime, CaO | Percentage Content of Cubic Crystals |
|---|---|
| Per cent | Per cent |
| 2.70 | 35 |
| 4.54 | 95 |
| 4.70 | 85 |
| 4.74 | 85 |
| 4.75 | 80 |
| 4.88 | 100 |
| 5.04 | 100 |

We believe that the failure of the percentage of cubic crystals to reflect increases and decreases in lime content in all cases was due to variations in reduction of silica in the several furnacing operations. Unless the silica is fully reduced some or all of the unreduced silica will combine with some of the lime to form a separate phase of calcium silicate thus making less lime available to stabilize the zirconia and to form cubic crystals. When enough carbon is provided to reduce all but about 0.5% of the silica, however, 3% of lime will yield at least 50% of cubic crystals and, if the small residue of unreduced silica is kept constant in a series of furnacing operations, the percentage content of cubic crystals will increase for every increase in the total lime content until the product is 100% cubic, so therefore it can be said that the cubic crystal content of the product is a function of the lime content of the furnace charge if other things are equal, or that the cubic crystal content is a function of the lime available for stabilization. The product according to this invention is predominantly cubic meaning that at least a little but more than 50% of the crystals are cubic. This result is attainable within the limits of 3% to 6% of lime on the amount of $ZrO_2$ in the ore in the furnace mixture.

When this fused material is crushed and roasted and made into bricks, plates or other shapes for commercial use, it is found that desirable characteristics are achieved when better than 50% of all the crystals are cubic. Such a product which is but little more than 50% cubic has utility particularly in the field of application where heat-shock requirements are severe. For example, when rectangular plates about 4" square by ¼" thick are made according to the invention with 55% to 85% cubic crystals and used as a support for special ceramic ware being fired in a tunnel kiln operating at 1260° C., the plates can be put through the kiln many times without fracture from heat shock or otherwise, even though the mechanical strength of the plates as a whole may not be as great as when a fused product containing a larger amount of cubic zirconia is employed.

For extremely high temperatures of application where maximum strength is desired in the product it may be desirable to employ stabilized zirconia fusions in which the amount of cubic zirconia is 75% to 90% or even more. A high content of cubic zirconia is considered to be advantageous for extremely high temperature applications where resistance to severe heat shock is not the most important factor.

To explain these particular results it is theorized that, although products made from fusions consisting of 100% cubic zirconia have a continuously uniform coefficient of expansion, thus avoiding completely the abnormal and eccentric expansion behavior of monoclinic zirconia, which passes through a phase change or inversion, nevertheless this expansivity of the cubic zirconia alone is somewhat higher than that of mixtures containing some of the monoclinic zirconia. The question seems to be one of avoiding a predominance of the fused monoclinic zirconia in the product because its disruptive expansion characteristic then becomes a controlling factor and causes the product to fail by cracking, and also, when maximum resistance to heat shock is desired, avoiding having 100% of the cubic zirconia since a small amount of the monoclinic zirconia tends to lower the average expansivity characteristics of the product as a whole.

As a guide to carrying out the invention in practice but not as a limitation thereto we will give a clear description of the mechanical steps in carrying out the furnace operation. A regular alumina electric arc furnace can be used, this type of furnace being of a size to produce, in the case of alumina, an ingot of about eleven tons. This is a common type of electric arc furnace. About two feet of mixture is placed on the carbon bottom of the furnace and then bridges of coarse coke are placed immediately under the electrodes to form a path from each electrode to each other electrode when they are lowered into the furnace in contact with the coke, these furnaces usually having three electrodes because they usually use three phase electric power although two electrode furnaces operating on single phase power can be used. The electrodes are lowered until they make contact with the coke bridges and current will flow across these bridges until sufficient of the mixture has melted to carry the power load. Furnace mixture is then added from time to time so as to keep only a thin layer of unmelted mixture on top of the gradually enlarging pool or bath of molten material until finally the electric furnace is full of molten material. Then the electrodes are removed and the furnace contents allowed to cool. When the ingot has solidified sufficiently so that there is no danger of molten material flowing from it through a crack or otherwise, the furnace shell is lifted from the pig and then after further cooling the pig is broken up by means of sledge hammers or skull crackers. The metallic button consisting mostly of ferro-silicon but with some titanium or other reduced products is found on the bottom of the ingot and this is removed for sale as a by-product or other use. The remainder of the product will be found to analyze about as follows:

Table V

| | Percent |
|---|---|
| $ZrO_2 + CaO$ | 97 to 99+ |
| $SiO_2$ | 0.14 to 0.70 |
| $Fe_2O_3$ | 0.20 to 0.70 |
| $TiO_2$ | 0.30 to 1.00 |

The broken material is hand sorted to remove remnants of unfused material and of ferro-silicon and then the good material is crushed to grit, preferably to grit sizes No. 4 and finer, then magnetically separated to remove any metal which may have been introduced during crushing or metal which was not removed during sorting. This product is now calcined under oxidizing conditions at a temperature of 1400° C. to 1450° C. for several hours to remove any traces of residual carbon or reduced oxides. The material is now ready for manufacture into bricks or other shapes to be used as indicated above.

It has long been known that zirconium oxide is highly refractory and it has been known that its melting point is around 2700° C. However it was found that it made an unsatisfactory refractory product because at a particular temperature there is a sharp volume change in the ordinary zirconium oxide to wit, the baddeleyite or monoclinic crystal form. The zirconia of this invention, however, which crystallizes predominantly in the cubic system does not have such a sharp volume change at any temperature and consequently is superior for the manufacture of refractory shapes and articles and thus full advantage may be taken of the high melting point of this oxide. In the manufacture of bricks and other articles out of the material of this invention we frequently mix a small amount of the monoclinic or unstabilized zirconium oxide with our stabilized zirconium oxide because a mixture has a lower temperature coefficient of expansion without the striking volume change that the pure or nearly pure monoclinic variety of baddeleyite has. However we do not recommend the use of more than 20% of the unstabilized zirconium oxide in admixture with our stabilized zirconium oxide.

Having thus produced the refractory material in many grit sizes, we can make bricks, tubes, crucibles, batts, combustion boats, combustion chambers, burner ports and many other articles by the following procedure: a quantity of stabilized zirconium oxide in accordance with this invention with or without some unstabilized zirconia up to 20% is wet with a suitable organic liquid such as a water solution of dextrine, placed in a mold to produce the desired shape and pressed under a pressure which is preferably at least 2,000 pounds per square inch and desirably somewhat higher, for example 5,000 to 6,000 pounds per square inch, and then the pressed article is removed from the mold, dried, and then sintered in a suitable kiln at a combination of temperature and time which for the particular article represents a heat treatment of about pyrometric cone 35. However, we have found it advantageous sometimes to fire the articles even higher than cone 35; for example, we have given articles according to this invention heat treatments right up to cone 42 with success.

The electric furnace product of this invention consists of 97% or more of stabilized zirconium oxide with calcium oxide. Bricks or other refractory articles according to this invention are at least 97% zirconium oxide plus calcium oxide but of this only 80% on the whole need be stabilized zirconium oxide with calcium oxide. In either case there may be up to 3% impurities but it is possible to make better than 99% pure zirconium oxide with calcium oxide and naturally the purer forms are preferred. In the cases equally of the electric furnace product of our invention and of bricks or other articles according to our invention the amount of calcium oxide should be from 3% to 6% of the amount of $ZrO_2$ in the ore and, since little $ZrO_2$ is lost during the furnacing operation, this can be stated as 3% to 6% calcium oxide on the $ZrO_2$ in the stabilized zirconium oxide product or an article made therefrom with or without the addition of unstabilized zirconium oxide up to 20% as stated. In the stabilized zirconium oxide per se the calcium oxide is in solid solution in the zirconium oxide. In the product of the electric furnacing operation producing the stabilized zirconia with lime in solid solution and also in the bricks or other articles made from that product, with or without some monoclinic zirconia added, the crystals are predominantly cubic, that is better than 50% of all the crystals are cubic.

To make the above statement clearer, a brick or other aticle should contain from 3% to 6% of CaO on the total $ZrO_2$ in the article, and such brick or other article should be better than 50% cubic counting not only the material therein which resulted from the fusion with lime but also the added monoclinic $ZrO_2$ some of which may become stabilized during the sintering of the article. And also the fusion product should be better than 50% cubic and contain between 3% and 6% CaO on the $ZrO_2$.

It will thus be seen that there has been provided by this invention an art, a composition of matter and an article in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

We claim:

1. A process for the manufacture of stabilized zirconia comprising fusing in an electric arc furnace an ore containing $ZrO_2$ together with a quantity of carbon which is two-thirds of the theoretical quantity of carbon required completely to reduce the silica plus 100% of the theoretical quantity required to reduce all the other oxides (except zirconia) to metal with up to 40% excess over the total of these quantities and together with an amount of iron that is enough to make with two-thirds of the silicon a ferrosililcon having an iron content of 75% to 85% minus the amount of iron obtained by the reduction of the iron oxide in the ore to iron, and together with a stabilizing agent consisting of calcium oxide, the quantity of stabilizing agent being from 3% to 6% of the amount of $ZrO_2$ in the ore.

2. A stabilized zirconium oxide characterized by having a crystal structure predominantly in the cubic system and the oxide having crystallized from a fusion of zirconium oxide containing ore with calcium oxide as a stabilizing agent, the quantity of calcium oxide being from 3% to 6% of the amount of $ZrO_2$ in the ore, the calcium oxide being in solid solution in the zirconium oxide crystals.

3. A refractory article consisting of at least 97% pure self-bonded crystalline zirconium oxide with calcium oxide, of which at least 80% is zirconium oxide stabilized with calcium oxide, and crystallized from a fusion of these oxides the crystals being predominantly cubic and those of the stabilized zirconium oxide containing calcium oxide in solid solution, the amount of calcium oxide in the article being from 3% to 6% of the total amount of $ZrO_2$ in the article.

ARCHIBALD H. BALLARD.
DOUGLAS W. MARSHALL.

No references cited